Aug. 21, 1945.  E. V. PAGE  2,383,272
DEEP HOLE INDICATING APPLIANCE
Filed April 30, 1943  2 Sheets-Sheet 1
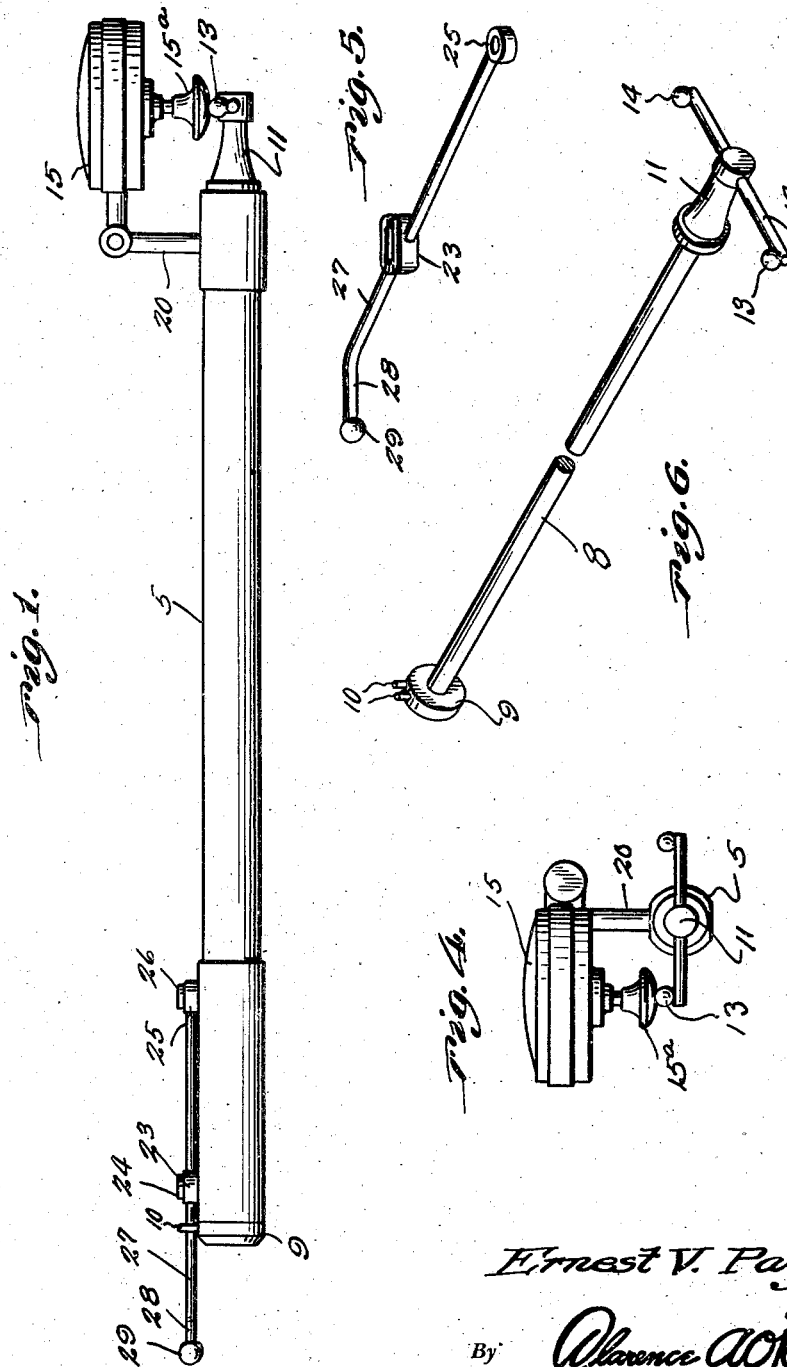
Inventor
Ernest V. Page
By Clarence A. O'Brien
and Harvey B. Jacobson
Attorneys Aug. 21, 1945.    E. V. PAGE    2,383,272
DEEP HOLE INDICATING APPLIANCE
Filed April 30, 1943    2 Sheets-Sheet 2
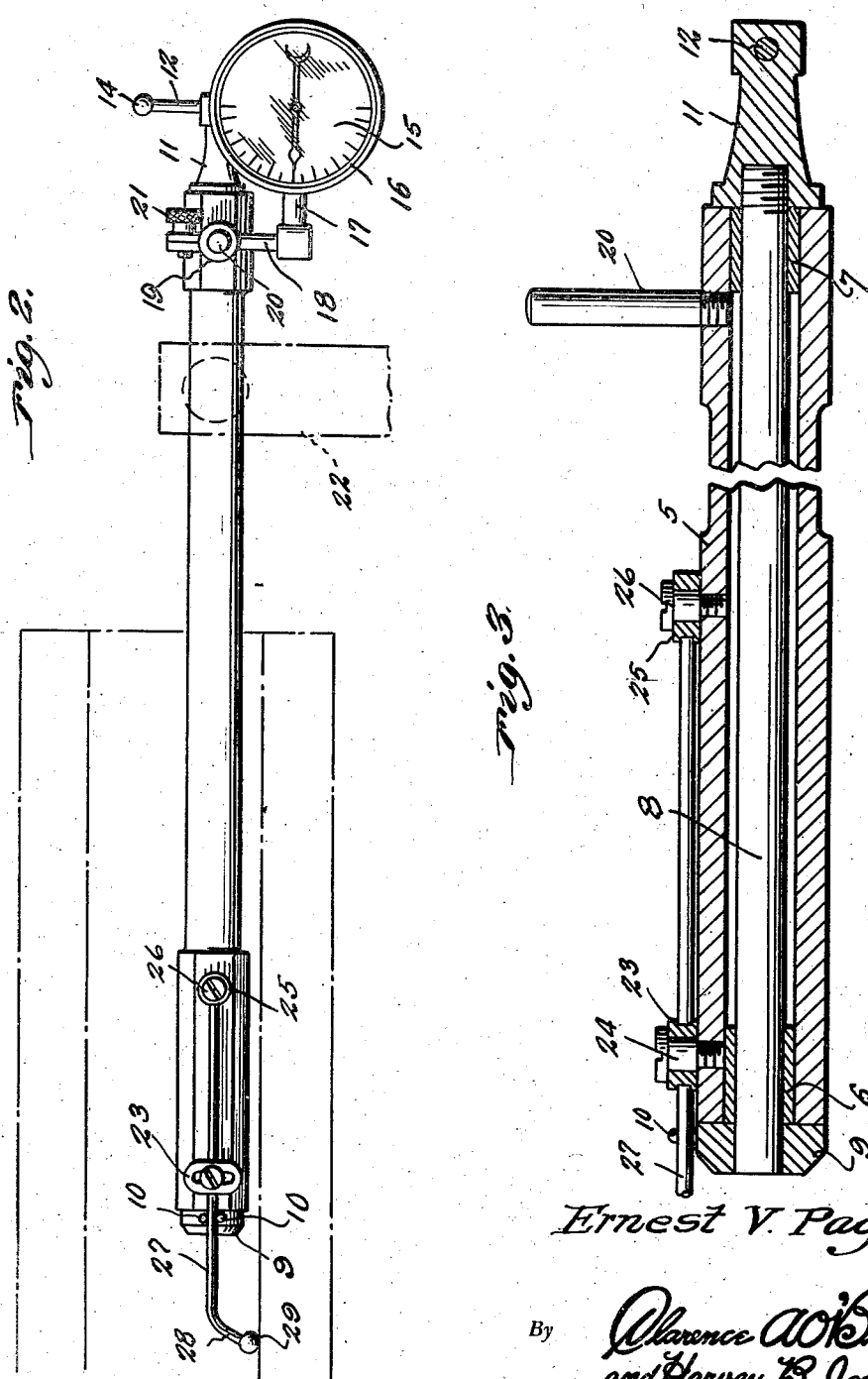
Inventor
Ernest V. Page
By Clarence A. O'Brien
and Harvey B. Jacobson
Attorneys Patented Aug. 21, 1945

2,383,272

UNITED STATES PATENT OFFICE 2,383,272

DEEP HOLE INDICATING APPLIANCE

Ernest V. Page, Portsmouth, N. H., assignor of one-half to Harold V. Flanders, No. Weare, N. H.

Application April 30, 1943, Serial No. 485,230

2 Claims. (Cl. 33—172)

This invention relates to new and useful improvements in gauges and more particularly to an appliance for gauging the interior of bores and other openings which cannot easily be reached by conventional means.

An important object of the invention is to provide an instrument for gauging work on lathes and also boring mills whereby the interior of deep openings can be measured efficiently and with precision.

Other objects and advantages of the invention will become apparent to the reader of the following description.

In the drawings:

Figure 1 represents a side elevational view of the device.

Figure 2 is a top plan view.

Figure 3 is a fragmentary longitudinal sectional view.

Figure 4 is an outer end elevational view.

Figure 5 is a perspective view of the feeler.

Figure 6 is a fragmentary perspective view of the shaft and gauge operator.

Referring to the drawings wherein like numerals designate like parts, it can be seen that numeral 5 denotes an elongated barrel having bushings 6, 7 in the ends thereof and through which an elongated shaft 8 is journaled. The shaft 8 at its work entering end has a cylindrical head 9 laterally from which projects a pair of closely spaced pintles 10, 10. The other end of the shaft 8 is threaded and disposed into a threaded recess in a shank 11, which shank has a cross pin 12 disposed therethrough and terminating in knobs 13, 14.

Projecting laterally from the outer end of the barrel 5 is a stud for supporting an indicating gauge 15 of conventional design. This gauge has a case 16 from which projects an arm 17 and laterally from this arm 17 is an arm 18 terminating in a split clamp 19 for embracing the stud 20. The clamp 19 has a clamp screw 21 for tightening the clamp 19 on the stud 20.

Any suitable supporting clamp 22 may be provided for the barrel 5.

The device is provided with a feeler which consists of a slotted block 23 through which a stud bolt is disposed and into the work entering end of the barrel 5. One end of the feeler has a collar 25 which embraces a second stud bolt 26, and on this stud bolt the feeler is pivoted.

The outer end of the feeler which is denoted by numeral 27 is obliquely disposed as at 28 and terminates in a small head 29. The feeler 27 passes between the pintles 10, 10.

It can now be seen that any action of the feeler 27 will impart rotary motion to the head 9 and to the shaft 8, which of course will rotate the cross pin 12 to the end that whichever knob 13 or 14 is engaging the actuating element 15ª of the indicator 15 will result in the operation of the indicator. One knob 13 or 14 is used when testing bores and other openings, while the other knob is used and the gauge instrument 15 changed accordingly when outside surfaces are being gauged.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A hole gauge of the character described comprising an elongated barrel, a shaft disposed longitudinally through the barrel and adapted for rotation, a springable feeler pivotally secured to one end of the barrel, means at a corresponding end of the shaft for engaging the feeler whereby the shaft is rotated when pressure is exerted on the feeler, a gauge instrument at the other end of the barrel and means driven by the shaft for actuating the instrument, said means for engaging the feeler comprising a pair of pintles projecting laterally from the shaft one at each side of the feeler.

2. In a gauge of the character described comprising an elongated barrel, a shaft rotatably disposed in the barrel, an indicating instrument mounted on one end of the barrel, operating means between the instrument and one end of the shaft, a swingable feeler pivotally secured to the opposite end of the barrel, a head on the shaft adjacent the feeler and provided with a pair of outstanding members between which the feeler is disposed, said feeler operating to rotate the shaft and consequently operate the instrument when pressure is exerted on said feeler.

ERNEST V. PAGE.